(12) United States Patent
Ishii et al.

(10) Patent No.: US 7,365,930 B2
(45) Date of Patent: Apr. 29, 2008

(54) LOAD/UNLOAD MECHANISM FOR MAGNETIC DISK DRIVE

(75) Inventors: Nobuyuki Ishii, Kanagawa (JP); Kazuhisa Murakami, Kanagawa (JP); Takashi Takenaka, Kanagawa (JP); Tomoki Hiramatsu, Kanagawa (JP)

(73) Assignee: Hitachi Global Storage Technologies, Amsterdam (NL)

( * ) Notice: Subject to any disclaimer, the term of this patent is extended or adjusted under 35 U.S.C. 154(b) by 135 days.

(21) Appl. No.: 11/446,044

(22) Filed: Jun. 1, 2006

(65) Prior Publication Data

US 2006/0274455 A1 Dec. 7, 2006

(30) Foreign Application Priority Data

Jun. 3, 2005 (JP) ............................. 2005-163642

(51) Int. Cl.
G11B 21/12 (2006.01)
(52) U.S. Cl. ...................................... 360/75; 360/254.8
(58) Field of Classification Search ............. 360/254.7, 360/254.8, 254.9, 255.6, 255.7, 255.8
See application file for complete search history.

(56) References Cited

U.S. PATENT DOCUMENTS

| | | | | |
|---|---|---|---|---|
| 5,394,281 A * | 2/1995 | Kajitani | ....................... | 360/75 |
| 5,808,837 A * | 9/1998 | Norton | ..................... | 360/254.3 |
| 5,831,786 A * | 11/1998 | Boutaghou et al. | ........... | 360/75 |
| 6,122,130 A * | 9/2000 | Boutaghou et al. | ........... | 360/75 |
| 6,441,982 B1 * | 8/2002 | Fukushima et al. | ........... | 360/59 |
| 7,046,474 B2 * | 5/2006 | Kuramoto et al. | ............ | 360/75 |
| 2003/0202274 A1 | 10/2003 | Onda et al. | .................. | 360/75 |

FOREIGN PATENT DOCUMENTS

JP 2002-367313 12/2002

* cited by examiner

Primary Examiner—Tan Dinh
Assistant Examiner—James L Habermehl
(74) Attorney, Agent, or Firm—Townsend and Townsend and Crew LLP; Duke Amaniampong (57) ABSTRACT

Formation of wear powder caused by wear of a ramp which is attributable to mutual contact of a lift tab and the ramp is to be reduced in loading and unloading operations. In one embodiment, a spindle motor is turned on by application of power, then the temperature of a ramp is measured and it is determined whether the temperature of the ramp has reached a preset temperature (about 25° C.) or not. If the answer is negative, a heater is energized to heat the ramp for raising the temperature of the ramp. When it is detected that the temperature of the ramp has reached the preset temperature, the heating of the ramp is stopped and the execution of loading and unloading operations is permitted, then an ordinary processing is started.

20 Claims, 6 Drawing Sheets

LOAD/UNLOAD MECHANISM FOR MAGNETIC DISK DRIVE

CROSS-REFERENCES TO RELATED APPLICATIONS

This application claims priority from Japanese Patent Application No. JP2005-163642, filed Jun. 3, 2005, the entire disclosure of which is incorporated herein by reference.

BACKGROUND OF THE INVENTION

The present invention relates to a magnetic disk drive and particularly to a load/unload mechanism for a magnetic head.

Along with the recent increased recording density of the magnetic disk drive, there is now a tendency to reduce the flying height of a magnetic head and to decrease the roughness of a magnetic disk surface. Therefore, according to the conventional contact start stop method wherein a magnetic head comes into contact with the surface of a magnetic disk when the rotation of the magnetic disk is stopped, the magnetic disk and the magnetic head are apt to adhere to each other, and as the case may be, the magnetic disk becomes difficult to start.

One of the methods for solving this technical problem is a method using a mechanism called a load/unload mechanism for loading and unloading a magnetic head with respect to a magnetic disk. This mechanism prevents mutual contact of the magnetic head and the magnetic disk when the rotation of the magnetic disk is stopped. According to this mechanism, when the rotation of the magnetic disk is stopped, a lift tab formed at a front end of a suspension is allowed to go up onto a ramp, whereby the magnetic head is brought into an unloaded state from the magnetic disk, while when the magnetic disk rotates, that is, during write or read of data, the magnetic head is moved (loaded) over the magnetic disk and is thus brought into a flying state.

However, the load/unload mechanism involves a problem in that a slide motion of the lift tab made of a metallic material causes a slide surface of the ramp made of a resin material to wear, thereby producing dust. The formation of dust must be prevented because it could cause a crash of the magnetic head.

According to a technique disclosed in Patent Literature 1 (Japanese Patent Laid-open No. 2002-367313), a porous member impregnated with lubricating oil is provided in at least part of a slide surface of a ramp to feed the lubricating oil to the slide surface of the ramp, thereby reducing sliding wear of the load/unload mechanism and preventing the formation of dust over a long period.

It has turned out that a frictional force acting between a lift tab and a ramp varies depending on the temperature of the lift tab and that of the ramp and exerts a great influence on the wear of a contact surface of the ramp. In a high temperature environment, the frictional force between the lift tab and the ramp is small in both loading and unloading operations and there scarcely occurs wear of the ramp caused by the repetition of loading and unloading operations. Conversely, in a low temperature environment, the frictional force between the lift tab and the ramp is large in both loading and unloading operations. This frictional force tends to become larger in proportion to falling temperature. Since the frictional force between the lift tab and the ramp thus becomes larger, when the lift tab is allowed to perform a motion of contact with the ramp, the wear of the ramp increases and the slide surface is scraped off. As a result, wear powder is produced, and once this wear powder drops onto the magnetic disk, the magnetic head when passing thereover treads on the wear powder. Consequently, the wear powder adheres to the magnetic disk or the magnetic head comes into contact with the magnetic disk, causing the occurrence of read and write errors of the magnetic head.

BRIEF SUMMARY OF THE INVENTION

It is a feature of the present invention to provide a magnetic disk drive which, even in a low temperature environment, can reduce wear of a ramp caused by a slide motion of a lift tab.

In accordance with an aspect of the present invention, a magnetic disk drive comprises: a magnetic disk; a motor carrying the magnetic disk thereon and causing the magnetic disk to rotate; a magnetic head for writing and reading data to and from the magnetic disk; a suspension having a projection at a front end thereof and supporting the magnetic head; a ramp having a slope where the projection goes up, at an outer end portion of the magnetic disk, and a withdrawal region contiguous to the slope; a heater for heating the ramp; and a temperature sensor for detecting the temperature of the ramp; wherein it is determined whether or not the temperature detected by the temperature sensor has reached a preset temperature upon start-up of the motor, if the temperature detected by the temperature sensor has reached the preset temperature, the heater heats the ramp, and if the temperature of the ramp has reached the preset temperature, a read or write operation of the magnetic head is started.

In some embodiments, the preset temperature is about 25° C. The temperature sensor is attached to the ramp. The heater is disposed under the ramp. The heater may be buried into the ramp. The heater may be substituted by a heat generating part and in this case a member that transmits the heat of the heat generating member to the ramp is provided. Preferably, the member is high in thermal conductivity and is metal.

In accordance with another aspect of the present invention, a magnetic disk drive comprises: a magnetic disk; a motor carrying the magnetic disk thereon and causing the magnetic disk to rotate; a magnetic head for writing and reading data to and from the magnetic disk; a suspension having a projection at a front end portion thereof and supporting the magnetic head; an actuator supporting the suspension and causing the suspension to move in the radial direction of the magnetic disk; a ramp having a slope where the projection goes up, at an outer end portion of the magnetic disk, and a withdrawal region contiguous to the slope; and a heater for heating the ramp; wherein, upon start-up of the motor, the magnetic head is loaded and unloaded with respect to the magnetic disk through the ramp, a frictional force between the projection and the ramp is measured, then it is determined whether or not the measured frictional force is in excess of a reference value, if the measured frictional force is not in excess of the reference value, the heater heats the ramp, and if the frictional force between the projection and the ramp is a value equal to or smaller than the reference value, a reading or writing operation of the magnetic head is started.

In some embodiments, the reference value corresponds to the frictional force between the projection and the ramp measured when the temperature of the ramp is about 25° C. The measurement of the frictional force is performed on the basis of an increase or decrease in drive current of the actuator. The temperature sensor is attached to the ramp. The heater is disposed under the ramp. The heater may be buried into the ramp. The heater may be substituted by a heat generating part and in this case a member that transmits the heat of the heat generating part to the ramp is provided. Preferably, the member is high in thermal conductivity and is metal.

According to the present invention it is possible to provide a magnetic disk drive which, even under a low temperature environment, can diminish wear of a ramp caused by a sliding motion of a lift tab.

DETAILED DESCRIPTION OF THE INVENTION

Figure 7:
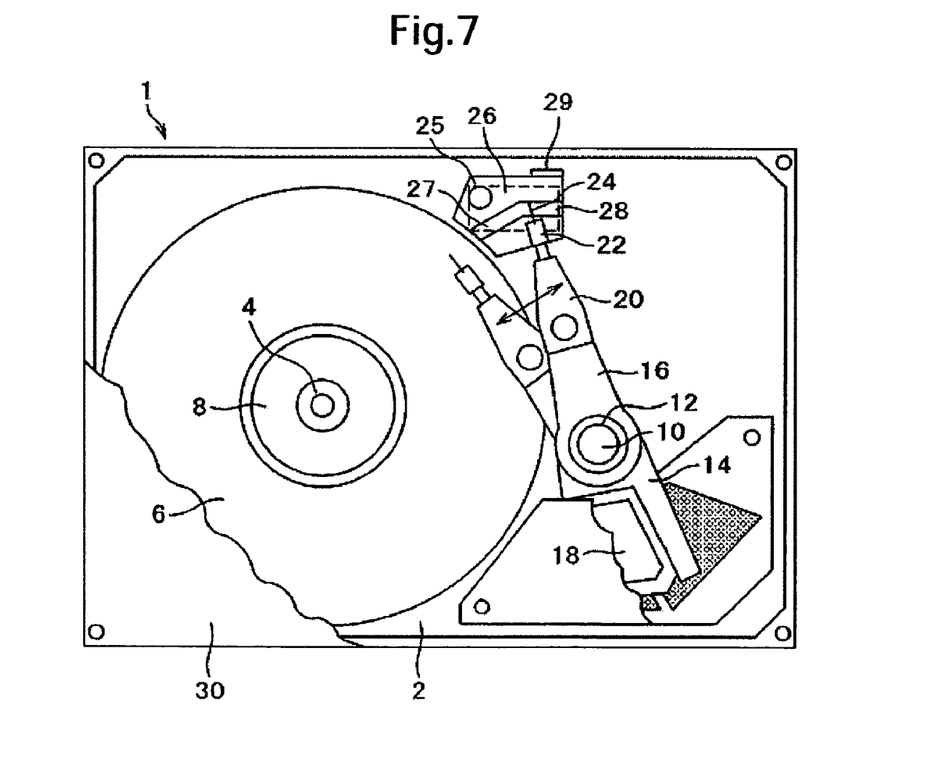
FIG. 7 is a schematic plan view showing an internal construction of the magnetic disk drive embodying the present invention.

FIG. 7 is a schematic plan view showing an internal construction of a magnetic disk drive 1 embodying the present invention. In the same figure, a spindle motor 4 is secured to a base 2 and a magnetic disk 6 is secured to the spindle motor 4, the magnetic disk 6 being fixed by a disk clamp 8. A pivot 10 is secured to the base 2 and an actuator 14 is secured to a pivot bearing 12 disposed around the pivot 10. The actuator 14 is composed of a head arm 16 and a voice coil motor (VCM) 18. A suspension 20 is secured to the head arm 16 and a magnetic head 22 is secured to the suspension 20. A lift tab (projection) 24 is formed at a front end portion of the suspension 20. Further, a ramp 25 is secured to the base 2 and a heater 26 for heating the ramp 25 is disposed under the ramp 25. On a surface of the ramp 25 on which the lift tab 24 slides are formed a slope 27 and a withdrawal region 28 corresponding to a head withdrawal position. A temperature sensor 29 for detecting the temperature of the ramp 25 is attached to the ramp 25. The lift tab 24 and the ramp 25 constitute a load/unload mechanism. FIG. 7 depicts the internal configuration of the magnetic disk drive with part of a cover omitted.

By carrying an electric current in the VCM 18 of the actuator 14, the actuator 14 turns around the pivot 10 and the magnetic head 22 supported by the suspension 20 moves while flying over the surface of the magnetic disk 6 to write or read data to or from the magnetic disk.

The load/unload mechanism prevents mutual contact of the magnetic head 22 and the magnetic disk 6 also when the rotation of the magnetic disk 6 is stopped. With the magnetic disk drive stopped, the magnetic head 22 does not lie over the surface of the magnetic disk, but lies at a withdrawal position corresponding to the withdrawal region 28 of the ramp 25 spaced away from an outer edge of the magnetic disk. Upon start-up of the magnetic disk drive 1, the spindle motor 4 starts rotating. When the number of revolutions of the spindle motor 4 and that of the magnetic disk 6 mounted on the spindle motor 4 reach a predetermined number of revolutions, the lift tab 24 moves from the withdrawal region 28 of the ramp 25 to the slope 27 to let the magnetic head 22 fly over the magnetic disk 6 and the magnetic head 22 is loaded over the surface of the magnetic disk. If a stop instruction is issued to the magnetic disk drive when the magnetic head 22 is performing read and write of data while flying over the magnetic disk surface, the magnetic head 22 starts operation for withdrawal from the magnetic disk 6. The actuator 14 moves the magnetic head 22 to the outer edge of the magnetic disk and the lift tab 24 comes into contact with a front end of the ramp 25 and begins to go up the slope 27. The magnetic head 22 begins to slowly move away from the magnetic disk surface, and when the lift tab 24 moves to the withdrawal region 28 of the ramp 25, the magnetic head 22 stays in that position. Then, the spindle motor 4 is stopped.

Figure 8:
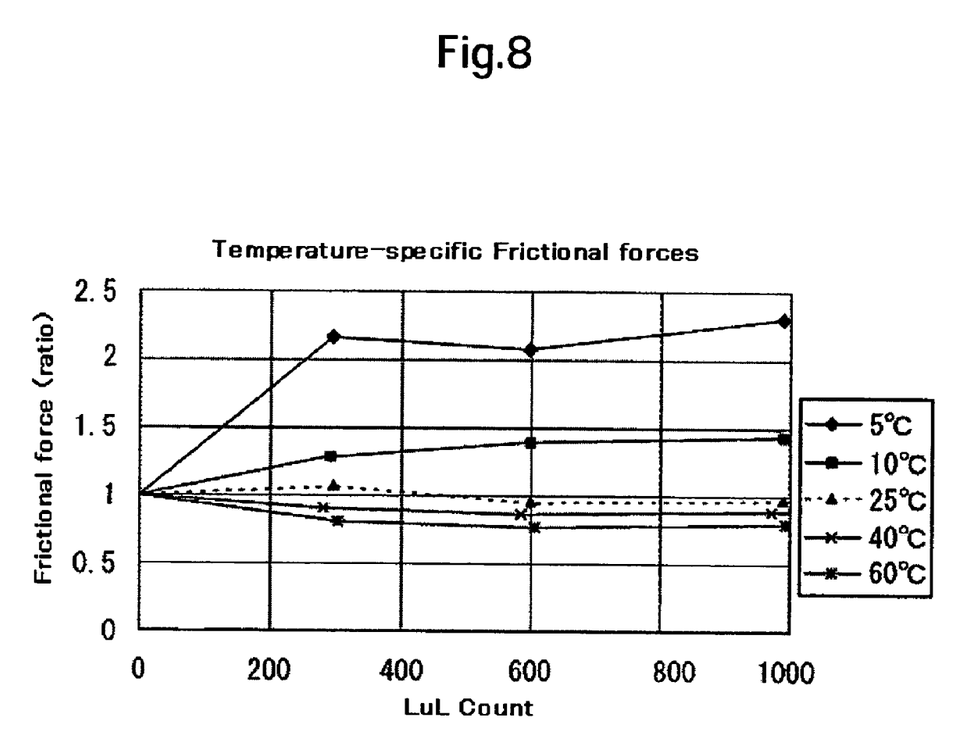
FIG. 8 is a diagram showing frictional forces according to temperatures between a lift tab and a ramp.

FIG. 8 shows the relationship between the ambient temperature and the frictional force between the lift tab 24 and the ramp 25. A load/unload count of the lift tab 24 and the ramp 25 is plotted along the axis of abscissa, while a frictional force ratio is plotted along the axis of ordinate. In the same figure, on the basis of a frictional force detected when the ambient temperature is 25° C. which is the ordinary temperature and the load/unload count is zero, the temperature is set to five levels (5° C., 10° C., 25° C., 40° C., 60° C.) and frictional forces of the lift tab 24 and the ramp 25 are measured at load/unload counts of 0 to 1000 and represented in terms of ratios to the reference value. The frictional force can be determined from an amount of increase of the driving current in the VCM 18 required for driving the actuator 14. The VCM current is monitored constantly for controlling the position of the actuator 14 and therefore it is also possible to observe an increase or decrease in the frictional force at all times. In FIG. 8, the frictional force increases under a low temperature environment relative to the reference temperature of 25° C. In particular, at 5° C., the frictional force is about twice as large as the reference value.

Figure 1:
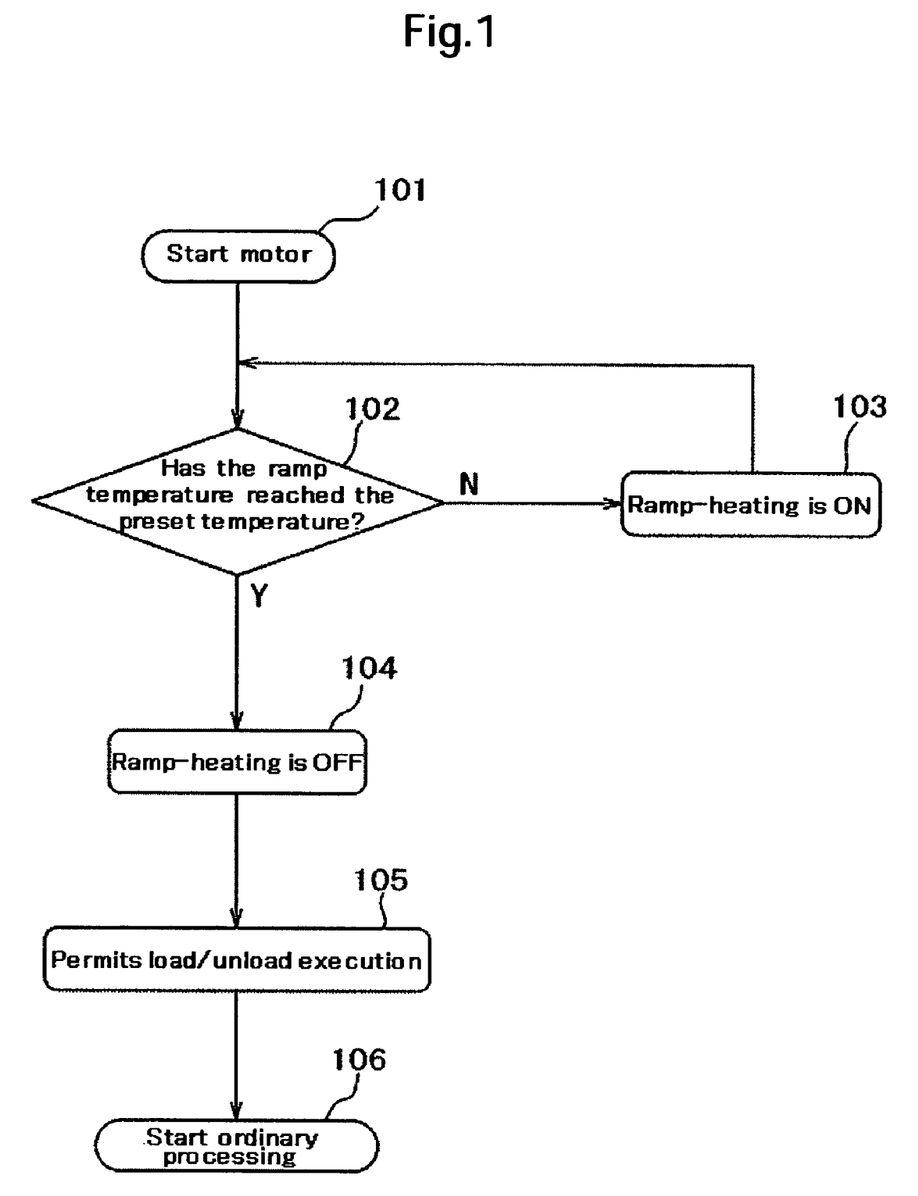
FIG. 1 is a flow chart showing how to control a frictional force between a lift tab and a ramp according to a first embodiment of the present invention.
Figure 2:
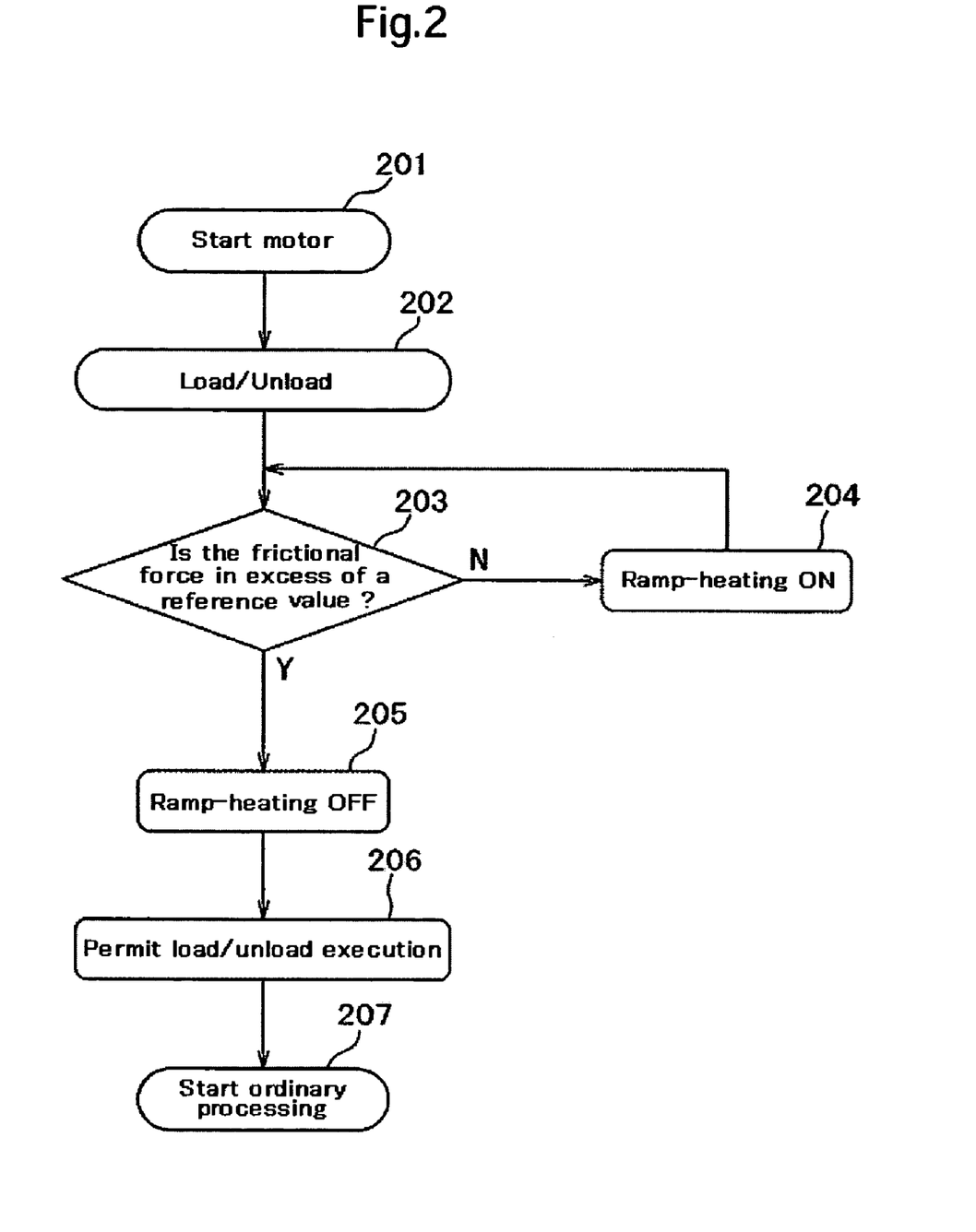
FIG. 2 is a flow chart showing how to control a frictional force between a lift tab and a ramp according to a second embodiment of the present invention.
Figure 3:
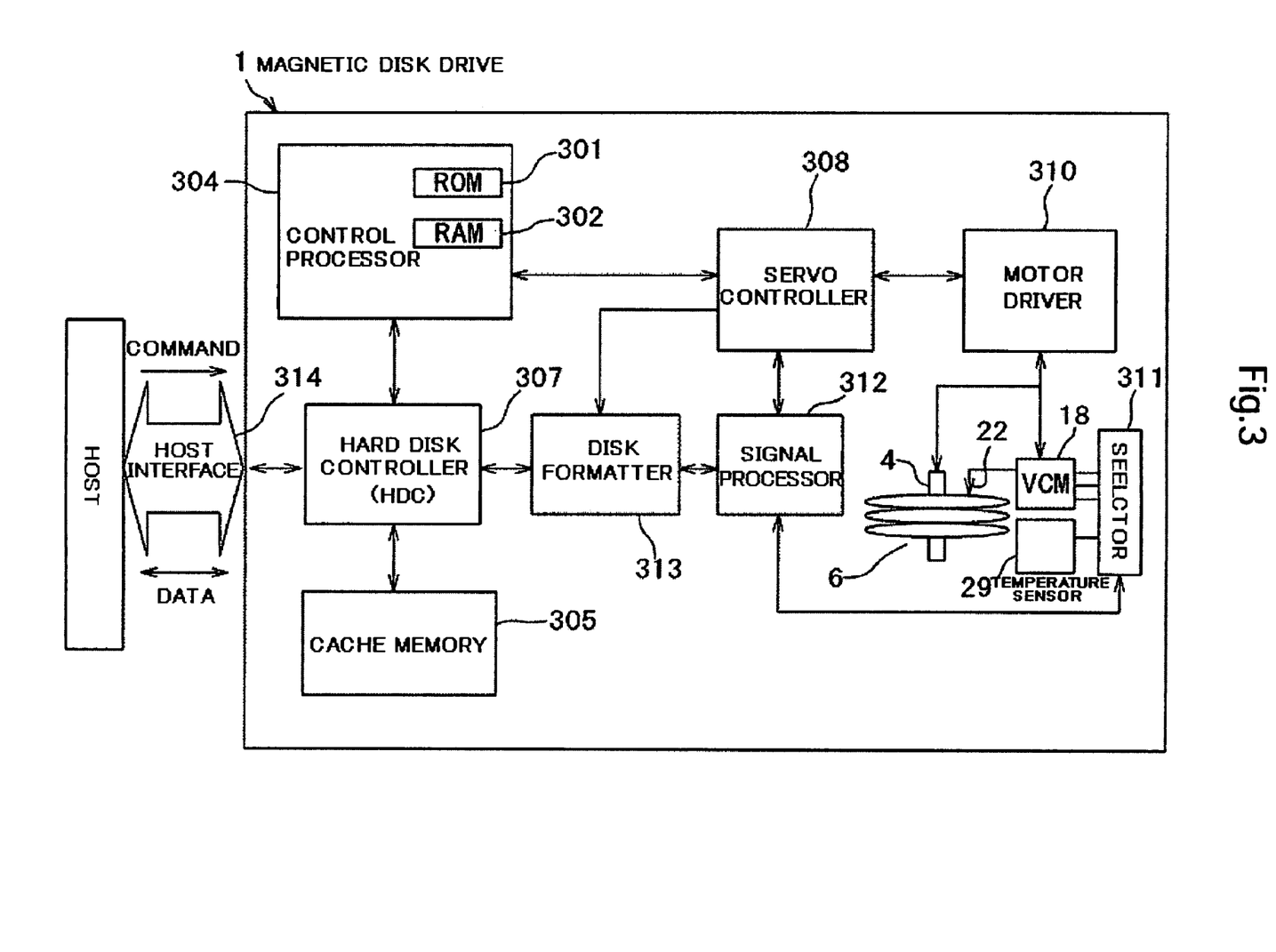
FIG. 3 is a block diagram of a magnetic disk drive embodying the present invention.

FIGS. 1 and 2 are flow charts showing how to control the frictional force between the lift tab 24 and the ramp 25 in accordance with embodiments of the present invention and FIG. 3 is a block diagram of the magnetic disk drive 1 for carrying out the control methods shown in FIGS. 1 and 2. Referring to FIG. 3, the magnetic disk drive 1 comprises a ROM 301 with control programs installed therein; a RAM 302 which stores a table for the management of data; a control processor 304 which incorporates the ROM 301 and the RAM 302 therein and which inputs and executes a control program on the ROM; and a cache memory 305 which writes read request data and write request data temporarily. The magnetic disk drive 1 further comprises; a hard disk controller (HDC) 307 which controls the transfer of data between host and cache and between cache and magnetic disk; a servo controller 308 which controls the VCM 18 for moving the magnetic head 22 to a designated position at the time of read or write of data; a motor driver 310 for controlling the rotation of the spindle motor 4; and a selector 311 for selecting only a designated magnetic head signal from among outputs of the temperature sensor 29 and magnetic signals inputted from the magnetic head 22. The magnetic disk drive 1 further includes a signal processor 312 which converts analog data fed from the selector 311 into digital data or converts digital data fed from the HDC 307 into analog data; a disk formatter 313 which transfers read data fed from the signal processor 312 to the cache memory 305 and transfers write data transferred from the cache memory 305 to the signal processor 312; and an interface controller 314 which exchanges commands and data.

Control of the frictional force between the lift tab 24 and the ramp 25 according to a first embodiment of the present invention is executed by the control processor 304 in accordance with a control program stored in the ROM 301. The spindle motor 4 is turned on by the application of power (step 101), then the temperature of the ramp 25 is measured and it is determined whether or not the ramp temperature has reached a preset temperature (about 25° C.) stored in the ROM 301 (step 102). If the answer is negative, the heater 28 is energized to heat the ramp 25 for raising the temperature of the ramp (step 103). If it is determined in step 102 that the temperature of the ramp 25 has reached the preset temperature, the heating of the ramp 25 is stopped (step 104) and the execution of loading and unloading operations is permitted (step 105). When the execution of load and unloading operations is permitted, ordinary processing is started (step 106).

Control of the frictional force between the lift tab 24 and the ramp 25 according to a second embodiment of the present invention is performed in the following manner. The spindle motor 4 is turned on by the application of power (step 201). When the spindle motor 4 is thus started to rotate and reaches a steady rotation, the magnetic head 22 once performs loading and unloading operations over the magnetic disk 6 (step 202). During the loading and unloading operations, the frictional force between the lift tab 24 and the ramp 25 is measured and if the frictional force is in excess of a reference value (a frictional force at a ramp temperature of about 25° C.) that is stored in the ROM 301 (step 203), the heater 28 is energized to heat the ramp 25 for raising the temperature of the ramp (step 204). When the frictional force is equal to or smaller than the reference value in step 203, the heating of the ramp 25 is stopped (step 205) and the execution of loading and unloading operations is permitted (step 206). When the execution of loading and unloading operations is permitted, the ordinary processing is started (step 207).

Figure 4:
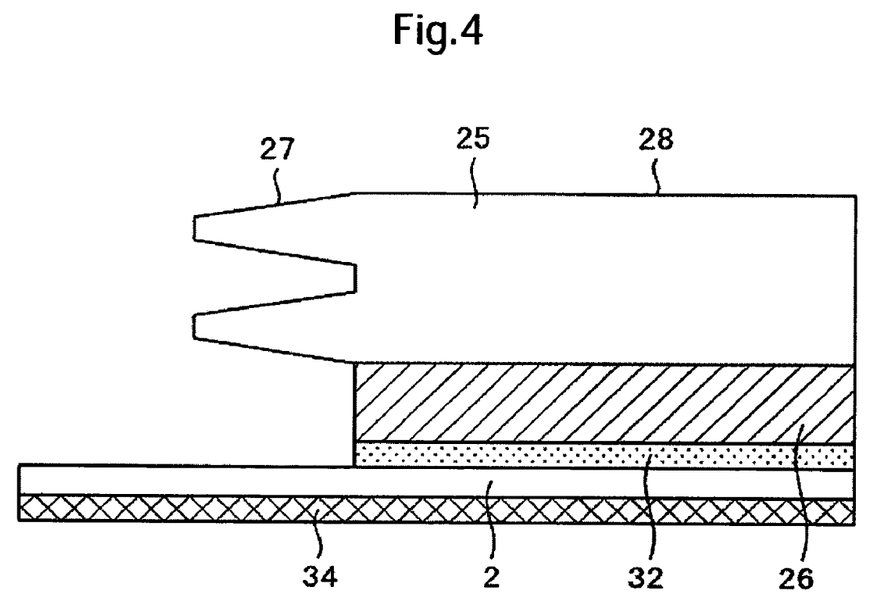
FIG. 4 is a sectional view showing a construction example of a ramp.
Figure 5:
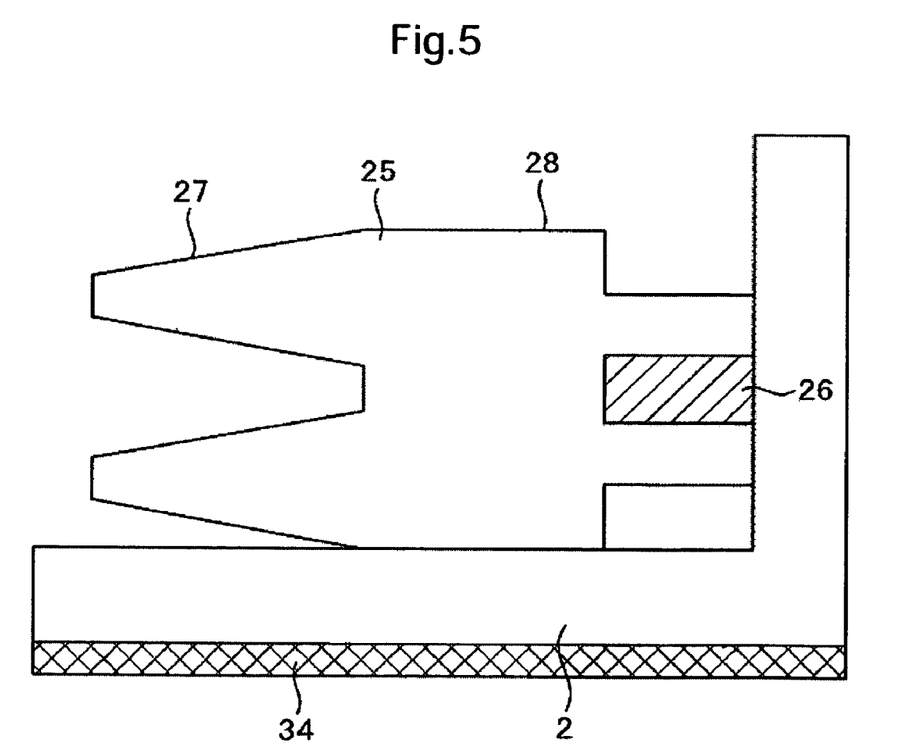
FIG. 5 is a sectional view showing another construction example of a ramp.
Figure 6:
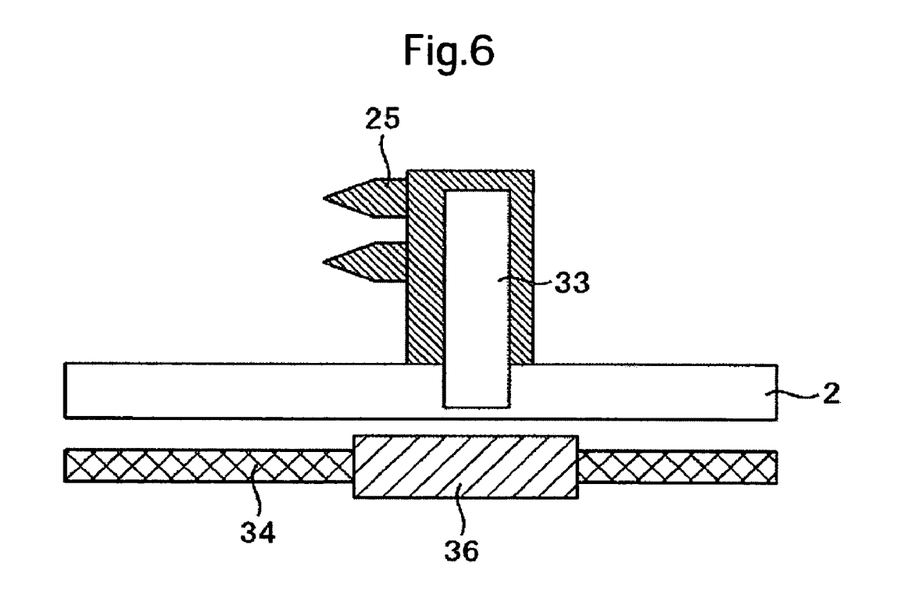
FIG. 6 is a sectional view showing a further construction example of a ramp.

Next, construction examples for heating the ramp 25 will be described with reference to FIGS. 4 to 6. FIG. 4 shows a construction example in which a heater 26 is installed between a base 2 and a ramp 25 and on a heat insulating material 32 provided on the base side. The heater 26 is, for example, a sheet heater comprising a ceramic sheet and a thin film resistor formed thereon. The supply of an electric current to the heater 26 can be done from a circuit board 34 which is installed under the base 2. A measured temperature of the heater 26 is received, as an output of the temperature sensor 29 (see FIG. 3) attached to the ramp 25, by the control processor 304 through the circuit board 34. FIG. 5 shows a construction example in which a heater 26 is buried into the ramp 25. The construction of the heater 26, the supply of an electric current and the input of a measured temperature are the same as in the previous example. FIG. 6 shows a construction example in which a heat generating part is substituted-for the heater and the ramp is heated from the exterior. A member (e.g., Cu) 33 high in thermal conductivity is affixed to a side face or bottom of the ramp 25 and the heat of a heat generating part 36, e.g., a power amplifier, mounted on the circuit board 34 is transmitted to the ramp 25 through the member 33 high in thermal conductivity. By using a metallic sheet, e.g., Cu sheet, as the member 33 high in thermal conductivity, the heat generated in the heat generating part 36 can be transmitted to the ramp 25 in a concentrative manner.

Thus, according to the above embodiments of the present invention, by raising the ramp temperature up to the ordinary ambient temperature in the state of a high frictional force between the lift tab and the ramp under a low temperature environment, it becomes possible to reduce wear of the ramp caused by mutual contact of the lift tab and the ramp. Consequently, the occurrence of troubles caused by dust is suppressed and it is possible to provide a highly reliable magnetic disk drive.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
    a magnetic disk;
    a motor coupled to said magnetic disk and causing the magnetic disk to rotate;
    a magnetic head for writing and reading data to and from said magnetic disk;
    a suspension having a projection at a front end thereof and supporting said magnetic head;
    a ramp having a slope where said projection goes up, at an outer edge portion of said magnetic disk, and a withdrawal region contiguous to said slope;
    a heater for heating said ramp; and
    a temperature sensor for detecting the temperature of said ramp;
    wherein it is determined whether or not the temperature detected by said temperature sensor has reached a preset temperature upon start-up of said motor, if the temperature has not reached the preset temperature, said ramp is heated by said heater, and if the temperature of said ramp has reached the preset temperature, a read or write operation of said magnetic head is started.

2. A magnetic disk drive according to claim 1, wherein said preset temperature is about 25° C.

3. A magnetic disk drive according to claim 1, wherein said temperature sensor is attached to said ramp.

4. A magnetic disk drive according to claim 1, wherein said heater is disposed under said ramp.

5. A magnetic disk drive according to claim 4, wherein said heater comprises a sheet heater having a ceramic sheet disposed on a base of said magnetic disk drive and a thin film resistor formed thereon.

6. A magnetic disk drive according to claim 5, wherein a circuit board installed under the base supplies electric current to the sheet heater.

7. A magnetic disk drive according to claim 1, wherein said heater is buried into said ramp.

8. A magnetic disk drive according to claim 1, wherein said heater is a heat generating part and a member that transmits the heat of said heat generating part to said ramp is provided.

9. A magnetic disk drive according to claim 8, wherein said member comprises metal.

10. A magnetic disk drive according to claim 9, wherein said member comprises a copper sheet.

11. A magnetic disk drive comprising:
a magnetic disk;
a motor carrying said magnetic disk thereon and causing the magnetic disk to rotate;
a magnetic head for writing and reading data to and from said magnetic disk;
a suspension having a projection at a front end portion thereof and supporting said magnetic head;
an actuator supporting said suspension and causing the suspension to move in the radial direction of said magnetic disk;
a ramp having a slope where said projection goes up, at an outer edge portion of said magnetic disk, and a withdrawal region contiguous to said slope; and
a heater for heating said ramp;
wherein, upon start-up of said motor, said magnetic head is loaded and unloaded with respect to said magnetic disk through said ramp, a frictional force between said projection and said ramp is measured, then it is determined whether or not the measured frictional force is in excess of a reference value, if the measured frictional force is not in excess of the reference value, said ramp is heated by said heater, and if the frictional force between said projection and said ramp reaches a value equal to or smaller than the reference value, a reading or writing operation of said magnetic head is started.

12. A magnetic disk drive according to claim 11, wherein said reference value corresponds to a frictional force between said projection and said ramp measured when the temperature of said ramp is about 25° C.

13. A magnetic disk drive according to claim 11, wherein the measurement of said frictional force is performed on the basis of an increase or decrease in drive current of said actuator.

14. A magnetic disk drive according to claim 11, wherein said temperature sensor is attached to said ramp.

15. A magnetic disk drive according to claim 11, wherein said heater is disposed under said ramp.

16. A magnetic disk drive according to claim 15, wherein said heater comprises a sheet heater having a ceramic sheet dispersed on a base of said magnetic disk drive and a thin film resistor formed thereon.

17. A magnetic disk drive according to claim 11, wherein said heater is buried into said ramp.

18. A magnetic disk drive according to claim 11, wherein said heater is a heat generating part and a member that transmits the heat of said heat generating part to said ramp is provided.

19. A magnetic disk drive according to claim 18, wherein said member comprises metal.

20. A magnetic disk drive according to claim 19, wherein said member comprises a copper sheet.

* * * * *